United States Patent [19]
Hedgepeth

[11] 3,779,582
[45] Dec. 18, 1973

[54] SWAY CONTROL UNIT
[76] Inventor: Edward B. Hedgepeth, P.O. Box 15394, Salt Lake City, Utah 84115
[22] Filed: Nov. 26, 1971
[21] Appl. No.: 202,199

[52] U.S. Cl. ............................ 280/446 B, 188/250.6
[51] Int. Cl. ..................... B62d 53/00, B60d 1/00
[58] Field of Search ............................ 280/446 B; 188/250 G

[56] References Cited
UNITED STATES PATENTS
3,468,557  9/1969  Ferrier ............................ 280/446 B
1,911,415  5/1933  Whitworth ................... 188/250 G X
3,294,421  12/1966  Mathisen ........................ 280/446 B
3,552,771  1/1971  Hendricks ................... 280/446 B X FOREIGN PATENTS OR APPLICATIONS
90,447  10/1967  France ............................ 280/446 B Primary Examiner—Leo Friaglia
Attorney—B. Deon Criddle

[57] ABSTRACT

A sway control unit to be linked between a towing vehicle and a towed vehicle and arranged to provide a uniform rotary frictional resistance to lateral weaving or swaying of the towed vehicle with respect to the towing vehicle, without adversely affecting free vehicle or necessary horizontal angular displacement of the vehicles relative to one another.

5 Claims, 3 Drawing Figures

PATENTED DEC 18 1973      3,779,582

INVENTOR:
EDWARD B. HEDGEPETH
BY:
ATTORNEY.

SWAY CONTROL UNIT

BRIEF DESCRIPTION OF THE INVENTION

1. Field of the Invention

This invention relates to linking arrangements between coupled vehicles that provide a resistance to lateral weaving or swaying of the towed vehicle.

2. Prior Art

It has long been recognized that there is a need for an apparatus that will retard or prevent the lateral swaying of a towed vehicle, such as a trailer, with respect to a towed vehicle.

There have been a number of devices proposed in the past to provide sway control. In my copending application for U.S. Pat., Ser. No. 864,604, entitled "Sway Control Unit", filed Oct. 8, 1969, and now U.S. Pat. No. 3,635,496 several such devices are noted. The aforementioned application also discloses a sway control unit which satisfactorily provides sway control of a towed vehicle in many situations. However, it has been found desirable in some situations to have a sway control unit that will provide a more constant non-variable resistance to sway of the towed vehicle with respect to the towing vehicle. Consequently, it is desirable that the effective moment arm between a rotational retarder brake and a linking shaft, joining the towed vehicle to the towing vehicle, be constant as the angular relationship between the two vehicles changes.

SUMMARY OF THE INVENTION

The present invention comprises a rotational retarder having a constant, non-variable moment arm arranged to rotate a friction pad.

Principal objects of the present invention are to provide a sway control device which will control undesired lateral swaying of a towed vehicle relative to a towing vehicle and that will induce a substantially constant rotational retarding force to resist the lateral swaying, regardless of the relative angular positioning of coupled towed and towing vehicles.

Principal features of the sway control unit include a rack and pinion arrangement that couples a frictional retarder assembly mounted to a tongue of a towed vehicle with a linking shaft that is connected by a ball and socket arrangement to a towing support of a towing vehicle.

A pinion gear is fixed to a shaft extending through the rotational retarder unit and its teeth are in meshing engagement with a straight chain section fixed to one side of a linking shaft and forming a rack with the shaft. A roller bearing is positioned to engage the opposite side of the linking shaft and to hold the rack and pinion in mesh. Movement of the linking shaft, in response to swaying or rotation of a towed vehicle with respect to a towing vehicle translates the gear rack against the pinion gear, thereby rotating a face of the gear against a brake pad. The brake pad provides frictional resistance to such rotation, and since the effective moment arm between the pinion gear and gear rack is the distance from the center of the gear to the roots of its teeth, the moment force applied to rotate the pinion gear does not change as a result of any change in the relative position of the towing and towed vehicles.

A bend formed in the linking shaft, proximate to its point of hinge coupling with the towing support of the towing vehicle, to allow a greater arc of rotation of the towed vehicle with respect to the towing vehicle than is possible with a straight linking shaft, while allowing the coupling on the towing vehicle to which the linking shaft is connected to be positioned nearer to the coupling joining the towed and towing vehicles.

The coupling joining the linking shaft with the towing vehicle consists of a ball on a towing support and a socket arrangement on the linking shaft, the ball being secured within the socket by a cotter-type pin inserted through a hole in a projection that extends from the top of the ball. This coupling arrangement is more fully described in my aforementioned copending patent application Ser. No. 864,604.

Additional objects and features of the invention will become apparent from the following detailed description and drawing disclosing what is presently contemplated as being the best mode of the invention.

THE DRAWING

Figure 1:
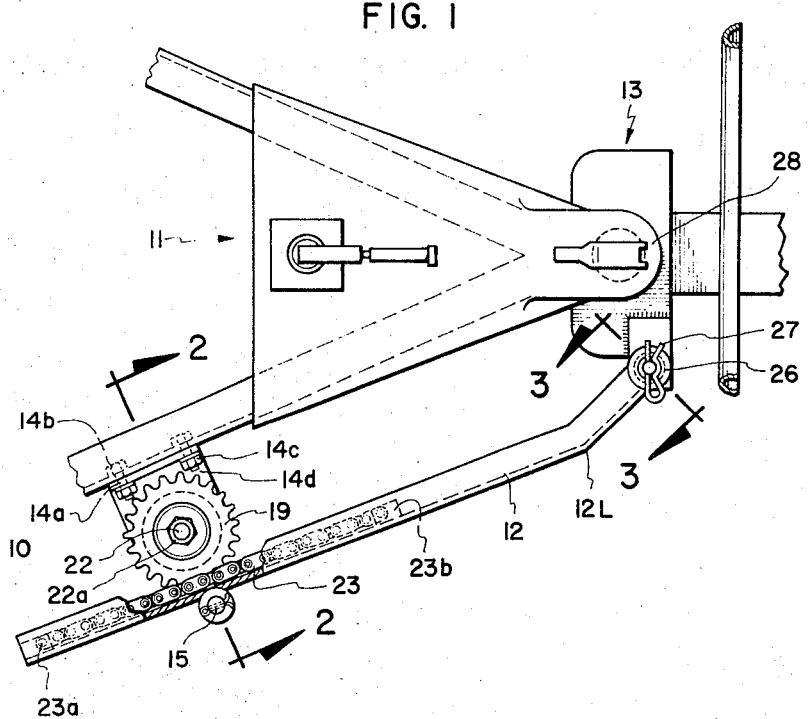
FIG. 1 is a plan view of the coupled vehicles fitted with the sway control unit.
Figure 2:
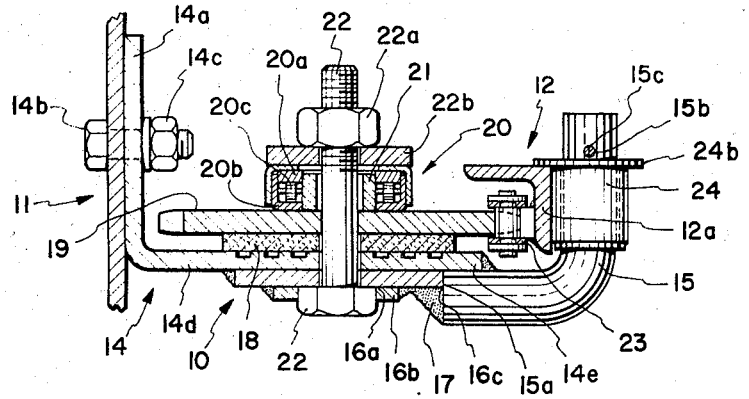
FIG. 2 is a vertical sectional view taken along section line 2—2 of FIG. 1.

In the illustrated preferred embodiment, the improved sway control unit of the invention includes generally a retarder unit 10, shown mounted on one fork of a bifurcated trailer tongue 11, and a rigid link 12 interconnecting the retarder unit and a towing support 13 fixed through a tow bar 13a to a towing vehicle, not shown.

The brake unit 10 includes an L-shaped mounting bracket 14, one leg 14a of which is adapted to be mounted by bolts 14b and nuts 14c or by welding, or the like, to trailer tongue 11. The other leg 14d of bracket 14 extends outwardly from the trailer tongue, and has an upper face with an irregular pad engaging surface formed thereon that serves as a brake pad support plate. One leg 15a of an L-shaped bearing roller support post 15 is welded or otherwise affixed to and projects from leg 14d. The other leg, 15b, extends upwardly therefrom for a purpose to be further explained. Reinforcement plates 16a and 16b may be welded beneath leg 14a of bracket 14.

A brake pad 18, of a suitable tough brake pad material such as reinforced Neoprene, is placed on the support plate face of leg 14d and is sandwiched between leg 14d and the undersurface of a pinion gear 19. It should be apparent that a brake pad arrangement combining a tough elastomeric material with cold-flow characteristics, such as "Adaprene" manufactured by the Dupont Corporation and contained by a surrounding ring or the like, as taught in my aforementioned application for patent, could be used as the brake pad 18.

The undersurface of pinion gear 19 serves as a brake plate, contacting the brake pad 18. A thrust bearing assembly 20 is positioned on top of pinion gear 19 and around a bushing 21 that surrounds a bolt 22. Bolt 22 extends through the entire assembly and a nut 22a thereon secures the assembly and provides a means whereby the frictional resistance developed between pad 18 and the brake plate undersurface of pinion gear 19 can be pre-set as desired.

Thrust bearing assembly 20 is a conventional assembly including an upper raceway 20a, a lower raceway 20b, with roller bearings 20c therebetween. Nut 22a acts on upper raceway 20a, forcing it downward against lower raceway 20b, through a washer 22b, and the lower raceway rests on and turns with pinion gear 19. The bearing assembly insures that pinion gear 19 will not be clamped so tightly by bolt 22 and nut 22a that it cannot be turned. At the same time, the bearing assembly allows movement of the brake plate without moving nut 22a and makes it easier to adjust the frictional restraint of the retarder unit 10 since the nut can be more easily turned when it is arranged against the upper raceway 20a, which can turn with respect to the roller bearings 20c.

Rigid link 12 consists of a length of angle stock with one leg 12a positioned opposite to teeth of pinion gear 19. A section of roller chain 23 is stretched and is fixed at its ends 23a and 23b to the inside surface of leg 12a, proximate to one end of rigid link 12. The link and chain 23 thus serve as a rack 24 with the chain being in meshing engagement with the teeth of pinion gear 19. It should be apparent that a rigid conventional gear rack, for example, having a number of teeth projecting from or an arrangement of holes or depressions formed in a rigid arm or, other like rack arrangement, with which the teeth of pinion gear 19 mesh could be used in lieu of the chain-type rack 24 herein disclosed.

The rack 24 mounted is held in meshing engagement with the teeth of pinion gear 19 by a bearing roller 24, which is rotatably fitted over the upstanding arm 15b of bearing roller support post 15. Bearing roller 25 telescopes over support post 15 and rest on the bend in the post. It is held in place by a washer 26 fitted over the upper end of the post 15 to contact the top of bearing roller 25 and the inturned leg 12b of the angle forming link 12. The washer is held in place by a cotter pin 15c inserted through a hole formed in the uppermost end of the leg 15b. The roller bearing thus allows free tangential reciprocation of the rigid link with respect to the gear 19 while holding the link such that the rack portion 24 thereof is in continuous meshing engagement with the teeth of gear 19.

Figure 3:
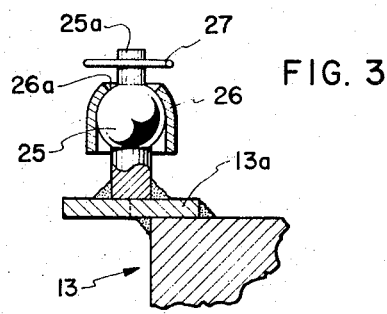
FIG. 3 is a vertical sectional view taken along line 3—3 of FIG. 1. Referring now to the drawings.

The other end of rigid link 12 is coupled to towing support 13 by a ball and socket arrangement. As illustrated, the ball and socket arrangement consists of an upstanding ball 27, as shown in FIG. 3, mounted to a top plate 13a of the towing support 13. A socket 28, fixed to the end of rigid link 12, is formed to fit over ball 27. Ball 27 has a projection 27a extending upward from its top which fits through an appropriate hole 28a formed through the socket 28. Projection 27a is locked through hole 28a, holding ball 27 within socket 28, by a safety clip 29 fitted through a hole formed through projection 27a. The ball and socket coupling provides a universal connection between the rigid link and the towing vehicle so that the sway control unit does not in any way adversely affect vertical angular displacement of the vehicles relative to one another. At the same time the connection allows for complete horizontal turning of the vehicles relative to one another, subject to the restraint imposed by the braking unit.

A bend, shown at 12c, is preferably formed in the rigid link 12 to enable the ball 27 to be positioned nearer to the ball of the usual ball hitch coupling means 30 interconnecting towing and towed vehicles. The bend at 12c allows for a greater angular displacement between the vehicles with the close relationship of coupling balls than would be possible if a straight rigid link was coupled to the ball 25.

In operation, turning of either vehicle with respect to the other will move the pinion gear 19 along the rack portion 24 of link 12 thereby rotating pinion gear 19 with respct to the brake pad 18 or the brake pad with respect to the plate formed on arm 14d. The frictional engagement between brake pad 18 and the underside of pinion gear 19 and between the brake pad and the plate on arm 14d thus serve to resist free swinging or swaying movement of the towed vehicle with respect to the towing vehicle, and force the towed vehicle to stay more nearly behind the towing vehicle except when a positive pushing or pulling force is applied that is strong enough to overcome the frictional resistance. The utilization of a gear and rack arrangement to transmit rotational retarding braking forces between the coupling of the towed and the towing vehicles provides a constant moment arm regardless of the angular relationship formed between the towed and towing vehicle, so that a more constant retarding effect is maintained.

Although a preferred form of my invention has been herein disclosed, it is to be understood that the present disclosure is made by way of example and that variations are possible without departing from the scope of the hereinafter claimed subject matter, which subject matter I regard as my invention.

I claim:

1. A sway control unit for connection between a towed vehicle and a towing vehicle comprising
   a retarder unit adapted to be fixed to one of said vehicles and including a brake pad member, a pinion gear having means thereon providing a brake plate member engaging the brake pad member, means supporting said brake pad and brake plate members, a shaft means coupling the brake plate member and brake pad member together about a common vertical central axis;
   a rigid link;
   means for universally coupling one end of said link to the other vehicle;
   a rack on said link arranged to be in meshing engagement with teeth of said pinion gear; and
   means holding said rack in meshing engagement with and pivotable about said pinion gear teeth when said rigid link is moved in response to a changing horizontal angular displacement of one vehicle with the other.

2. A sway control unit for connection between a towed vehicle and a towing vehicle as recited in claim 1, wherein
   the means supporting said brake pad and brake plate members comprises a support plate having an irregular surface thereon such that the compressing of the brake pad between the brake plate member and support plate tends to force the pad into said irregularities in said support member.

3. A sway control unit for connection between a towed vehicle and a towing vehicle as recited in claim 2, further including
   adjustable clamping means for clamping the brake pad between the brake plate and the support plate said adjustable clamping means comprising a threaded shaft extending through the support plate, pad and brake plate, a thrust bearing on the brake plate, and a nut threaded onto said shaft against said thrust bearing.

4. A sway control unit for connection bbtween a towed vehicle and a towing vehicle as recited in claim 1, wherein
the rack arrangement comprises a straight section of roller chain stretched and fixed to the rigid link.

5. A sway control unit for connection between a towed vehicle and a towing vehicle comprising
a retarder unit adapted to be fixed to one of said vehicles and including a brake pad member, a pinion gear having means thereon providing a brake plate member engaging the brake pad member, means supporting said brake pad and brake plate members, a shaft means coupling the brake plate member and brake pad member together about a common central axis;
a rigid link;
means for universally coupling one end of said link to the other vehicle;
a rack on said link arranged to be in meshing engagement with teeth of said pinion gear; and
means holding said rack in meshing engagement with said pinion gear teeth when said rigid link is moved in response to a changing horizontal angular displacement of one vehicle with the other, said means including a roller mounted to engage and maintain the rigid link tangentially to the gear.

* * * * *